UNITED STATES PATENT OFFICE.

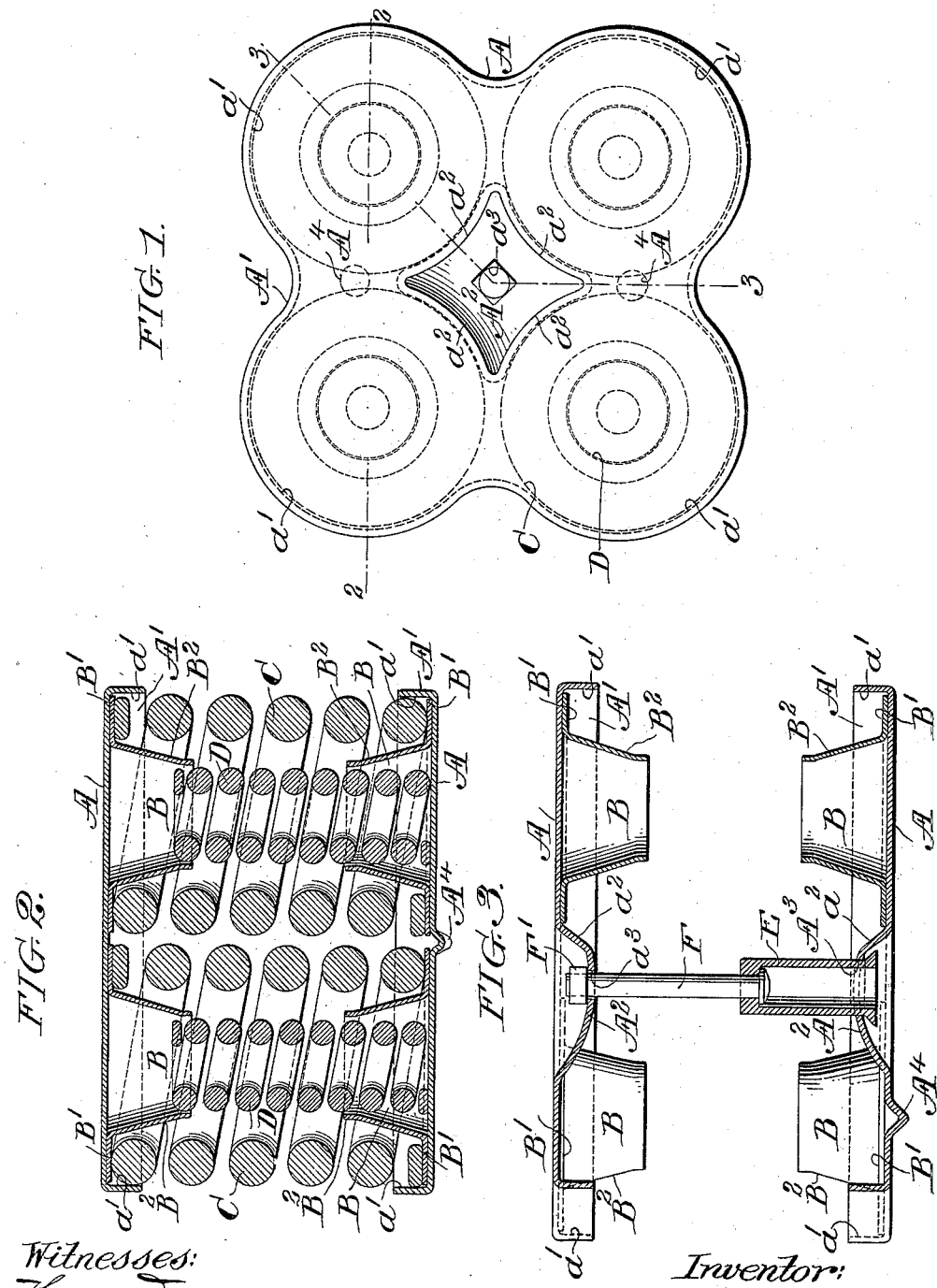

NATHAN H. DAVIS, OF PHILADELPHIA, PENNSYLVANIA.

SPRING AND SPRING-PLATE.

SPECIFICATION forming part of Letters Patent No. 638,498, dated December 5, 1899.

Application filed January 17, 1899. Serial No. 702,391. (No model.)

*To all whom it may concern:*

Be it known that I, NATHAN H. DAVIS, a citizen of the United States of America, residing in the city and county of Philadelphia, in the State of Pennsylvania, have invented a certain new and useful Improvement in Springs and Spring-Plates, of which the following is a true and exact description, reference being had to the accompanying drawings, which form a part thereof.

My invention relates to the construction of composite springs such as are commonly used in connection with railway-cars and in which a series of springs, generally of a spiral nature, are held between plates known as "spring-plates" and constitute a composite spring.

The object of my invention is to provide a spring of the above character having some novel and useful features of construction, the nature of which will be best understood as described in connection with the drawings, in which my spring is illustrated, and in which—

Figure 1 is a plan view of the spring; Fig. 2, a cross-sectional view taken on the line 2 2 of Fig. 1, and Fig. 3 a cross-sectional view taken on the irregular line 3 3 of Fig. 1 and omitting the springs.

A A are the spring-plates, of which two are used in each composite spring. These plates I form with peripheral upwardly-turned flanges A' and with a central elevated projection $A^2$, the conformation of the peripheral flange and central projection being such as to form a series of seats or preferably circular plates, such seats being indicated in the drawings as formed between the convexly-curved portions $a'$ of the peripheral flange and the concentrically-curved portions $a^2$ of the central projection.

B B, &c., indicate what I will call "flanged thimble-plates," each provided with a flat and preferably circular flange B', from which projects a hollow thimble-like portion $B^2$. The flat flanged portions B' are in form and dimensions such as will enable them to fit with some nicety in the seats formed in the plate A, so that each individual flanged thimble-plate is held in position in its appropriate seat and without reference to the other flanged thimble-plates used in the construction of the spring.

C C, &c., indicate coil-springs the ends of which extend over the thimble portions $B^2$ and rest against the flanged portions B' of each pair of oppositely-disposed thimble-plates. D D, &c., are also coil-springs, shorter in length than the springs C and with a diameter which enables them to pass inside of the thimbles $B^2$, the length of the springs D being, as indicated in Fig. 2, such that they are always "engaged," so to speak, and guided by the thimbles, even when the spring is unpressed.

The spring-plates A A are held together in any convenient and well-known manner. As shown, I form central perforations $A^3$ and $a^3$ in the plates, a hollow thimble E being secured in the lower perforation and a bolt F serving to connect the thimble with the upper plate A.

$A^4$ $A^4$ indicate projections from the plates A, by which they are anchored in the beam or bolsters of the parts between which they are set.

Having now described my invention, what I claim as new, and desire to secure by Letters Patent, is—

1. A spring-plate A having a peripheral flange turned upward or toward its face and a projection or projections in its face to serve in connection with the flange to properly space and form separate seats for a series of two or more flanged thimble-plates in combination with two or more such flanged thimble-plates B each having a flat flange B' adapted to rest on the spring-plate in a seat formed between the peripheral flange and the face projection and to be held in place thereby said thimble-plates having also a hollow projecting thimble $B^2$ adapted to center and guide an inner and outer coiled spring.

2. The combination with two spring-plates A A, each having peripheral flanges and face projections forming separate seats on its face, of flanged thimble-plates B each having a flat flange B' adapted to rest on the face of one of the plates and in one of the seats formed thereon and a hollow thimble-like projection extending from said flange, coiled spiral springs C C fitting over the thimbles $B^2$ of two opposite thimble-plates B and resting against the flange B' thereof, and coiled spiral springs D D the ends of which fit in the hollow thimbles of the plates B, said springs being of shorter length than the outer springs C.

NATHAN H. DAVIS.

Witnesses:
CHAS. F. MYERS,
D. STEWART.